(12) United States Patent
Kim et al.

(10) Patent No.: US 8,005,168 B2
(45) Date of Patent: Aug. 23, 2011

(54) COMMUNICATION APPARATUS USING CHAOTIC SIGNAL AND METHOD THEREOF

(75) Inventors: Jae-hyon Kim, Suwon-si (KR); Sang-min Han, Hwaseong-si (KR); Young-hwan Kim, Hwaseong-si (KR); Mi-hyun Son, Seoul (KR); Hyuncheol Park, Daejeon (KR); Kwonhyung Lee, Daejeon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1029 days.

(21) Appl. No.: 11/846,158

(22) Filed: Aug. 28, 2007

(65) Prior Publication Data

US 2008/0260381 A1 Oct. 23, 2008

(30) Foreign Application Priority Data

Apr. 18, 2007 (KR) ........................ 10-2007-0038082

(51) Int. Cl.
*H04L 25/06* (2006.01)
(52) U.S. Cl. ........................................ 375/317; 375/141
(58) Field of Classification Search .................. 375/146, 375/140, 141, 317
See application file for complete search history.

(56) References Cited

U.S. PATENT DOCUMENTS

| 5,914,922 A * | 6/1999 | Supino et al. ............. 369/44.28 |
| 2002/0064245 A1 * | 5/2002 | McCorkle ..................... 375/346 |
| 2003/0081697 A1 * | 5/2003 | Little ............................ 375/317 |

OTHER PUBLICATIONS

Kwonhyung Lee; Soocheol Kyeong; Jaehyon Kim; Younghwan Kim; Hyuncheol Park, "A Chaotic UWB System for Home networks," Hybrid Information Technology, 2006. ICHIT '06. Issue Date: Nov. 9-11, 2006.*
JaeSang Cha; KyungSup Kwak; ChongHyun Lee; JaeHo Jeong; Il-Kyoo Lee; "Chaotic-OOK UWB modem Using new unipolar ZCD codes for wireless PAN," Consumer Electronics, 2006. ICCE '06. 2006 Digest of Technical Papers. International Conference on. Issue Date: Jan. 7-11, 2006.*
S. K. Yong, C. C. Chong and G. Kolumban, "Non-coherent UWB radio for low-rate WPAN applications: a chaotic approach," International Journal of Wireless Information Networks, Springer Netherlands, DOI: 10.1007/s10776-006-0045-y, Dec. 2, 2006.*

* cited by examiner

*Primary Examiner* — Shuwang Liu
*Assistant Examiner* — David Huang
(74) *Attorney, Agent, or Firm* — Sughrue Mion, PLLC

(57) ABSTRACT

A communication apparatus using a chaotic signal and a method thereof are provided. The communication apparatus includes a correlator which multiplies source data by one of an optical orthogonal code (OOC) and a prime sequence code (PSC), and outputs transmission data, a transmission signal generating unit which generates a chaotic transmission signal by masking the transmission data with respect to a chaotic signal, and an antenna which transmits the chaotic transmission signal. As a result, multiple accesses are enabled, and a wireless communication system for short-distance operation, which is economic and low power-consuming, is provided.

18 Claims, 11 Drawing Sheets

COMMUNICATION APPARATUS USING CHAOTIC SIGNAL AND METHOD THEREOF

CROSS-REFERENCE TO RELATED APPLICATIONS

This application claims the benefit of Korean Patent Application No. 10-2007-0038082, filed Apr. 18, 2007, in the Korean Intellectual Property Office, the entire disclosure of which is incorporated herein by reference.

BACKGROUND OF THE INVENTION

1. Field of the Invention

Apparatuses and methods consistent with the present invention relate to a communication apparatus using chaotic signal and method thereof. More particularly, the present invention relates to a communication apparatus which performs multiple accesses in a wireless communication system using On-Off Keying (OOK) which uses chaotic signal, and a method thereof.

2. Description of the Related Art

A wireless communication system includes a plurality of piconets formed by a plurality of independent communication devices. These communication devices adopt code division multiplexing access (CDMA) to perform multiple accesses. The CDMA allocates psuedo random noise (PN) to the carrier wave signals used by the communication devices, to prevent interferences.

SUMMARY OF THE INVENTION

Exemplary embodiments of the present invention have been provided to address at least the above problems and/or disadvantages, and to provide at least the advantages described below. Accordingly, an exemplary aspect of embodiments of the present invention is to provide a communication apparatus and a method thereof, which use chaotic signal in the establishing of a wireless communication system capable of multiple accessing in an asynchronous communication environment, in which the chaotic signal is masked by applying an On-Off Keying (OOK) to a signal which is generated by an optical orthogonal coding (OOC) or a prime sequence coding (PSC).

Another exemplary aspect of embodiments of the present invention is to provide a communication apparatus and a method thereof, which adopts a non-coherent scheme to detect the energy, using a threshold varied according to the characteristic of a received carrier wave signal, so that a wireless communication system for short-distance operation which is economic, and less power-consuming, can be provided.

The foregoing and other objects and advantages are substantially realized by providing a communication apparatus, including a correlator which multiplies source data by a user unique code provided for multiaccess, and outputs transmission data, a transmission signal generating unit which generates a chaotic transmission signal by masking the transmission data with respect to a chaotic signal, and an antenna which transmits the chaotic transmission signal.

The user unique code may be one of an optical orthogonal code (OOC) and a prime sequence code (PSC).

The transmission signal generating unit may generate the chaotic transmission signal in radio frequency (RF) format, by masking the chaotic signal with respect to the transmission data using on-off keying (OOK).

The communication apparatus according to an exemplary embodiment of the present invention may further include a detecting unit which detects an envelope of the chaotic transmission signal being received over the antenna, and converts the detected signal into a curved signal, a computing unit which computes maximum and minimum levels of the curved signal, and a slicer which converts the curved signal into digital data, by applying a hysteresis thresholding based on the maximum and minimum levels.

The computing unit may compute the maximum and minimum levels which are varied in real time basis according to the received chaotic transmission signal.

The communication apparatus according to an exemplary embodiment of the present invention may further include a peak detecting unit which divides one frame of the curved signal into a plurality of segments, detects maximum and minimum values of the respective segments, and computes maximum and minimum averages. The computing unit may compute the maximum and minimum levels, using the maximum and minimum averages.

The computing unit may compute the maximum and minimum levels by:

$$V_{high} = V_{min} + (Y+X)*\text{Delta}$$

$$V_{low} = V_{min} + (Y-X)*\text{Delta}$$

where $V_{high}$ denotes maximum level, $V_{low}$ denotes minimum level, $V_{max}$ denotes maximum average, $V_{min}$ denotes minimum average, $\text{Delta} = V_{max} - V_{min}$, and X and Y denote variables set by a user according to the simulation to minimize the bit error rate (BER).

The foregoing and other objects and advantages are substantially realized by providing a communication apparatus, including a detecting unit which detects an envelope of a received chaotic transmission signal and converts the signal into a curved signal, a computing unit which computes maximum and minimum levels of the curved signal, a slicer which converts the curved signal into digital data, by applying a hysteresis thresholding based on the maximum and minimum levels, and a correlator which computes correlativity by multiplying the digital data by one of optical orthogonal code (OOC) and prime sequence code (PSC).

The computing unit may compute the maximum and minimum levels which are varied in real time basis according to the received chaotic transmission signal.

The communication apparatus according to an exemplary embodiment of the present invention may further include a peak detecting unit which divides one frame of the curved signal into a plurality of segments, detects maximum and minimum values of the respective segments, and computes maximum and minimum averages. The computing unit may compute the maximum and minimum levels, using the maximum and minimum averages.

The computing unit may compute the maximum and minimum levels by:

$$V_{high} = V_{min} + (Y+X)*\text{Delta}$$

$$V_{low} = V_{min} + (Y-X)*\text{Delta}$$

where $V_{high}$ denotes maximum level, $V_{low}$ denotes minimum level, $V_{max}$ denotes maximum average, $V_{min}$ denotes minimum average, $\text{Delta} = V_{max} - V_{min}$, and X and Y denote variables set by a user according to the simulation to minimize the bit error rate (BER).

The communication apparatus according to an exemplary embodiment of the present invention may further include a transmission signal generating unit which generates the chaotic transmission signal in radio frequency (RF) format, by masking the chaotic signal with respect to the transmission data using on-off keying (OOK).

The communication apparatus according to an exemplary embodiment of the present invention may further include an antenna which transmits and receives the chaotic transmission signal, and a switch unit which connects, by switching, the antenna with the detecting unit if the communication apparatus operates as a transmitter, and which connects, by switching, the antenna with the transmission signal generating unit if the communication apparatus operates as a receiver.

The foregoing and other objects and advantages are substantially realized by providing a communication method including detecting an envelope of a received chaotic transmission signal, and converting the detected signal into a curved signal, computing maximum and minimum levels of the curved signal, and converting the curved signal into digital data, by applying a hysteresis thresholding based on the maximum and minimum levels, and computing correlativity by multiplying the digital data by a user unique code provided for multiaccess.

The user unique code may be one of an optical orthogonal code (OOC) and a prime sequence code (PSC).

The computing the maximum and minimum levels may include computing the maximum and minimum levels which are varied in real time basis according to the received chaotic transmission signal.

The communication method according to an exemplary embodiment of the present invention may further include dividing one frame of the curved signal into a plurality of segments, and detecting maximum and minimum values of the respective segments, and computing maximum and minimum averages.

The computing the maximum and minimum levels may include computing the maximum and minimum levels, using the maximum and minimum averages.

The computing the maximum and minimum levels may include computing the maximum and minimum levels by:

$$V_{high}=V_{min}+(Y+X)*\text{Delta}$$

$$V_{low}=V_{min}+(Y-X)*\text{Delta}$$

where $V_{high}$ denotes maximum level, $V_{low}$ denotes minimum level, $V_{max}$ denotes maximum average, $V_{min}$ denotes minimum average, Delta=$V_{max}-V_{min}$, and X and Y denote variables set by a user according to the simulation to minimize the bit error rate (BER).

The communication method of according to an exemplary embodiment of the present invention may further include generating the chaotic transmission signal in radio frequency (RF) format, by masking the chaotic signal with respect to the transmission data using on-off keying (OOK).

BRIEF DESCRIPTION OF THE DRAWINGS

The above and other aspects and features of the present invention will become more apparent by describing certain exemplary embodiments of the present invention with reference to the accompanying drawings, in which.

Throughout the drawings, the same drawing reference numerals will be understood to refer to the same elements, features and structures.

DETAILED DESCRIPTION OF EXEMPLARY EMBODIMENTS

Certain exemplary embodiments of the present invention will now be described in greater detail with reference to the accompanying drawings.

The matters defined in the description, such as detailed constructions and elements, are provided to assist in a comprehensive understanding of the embodiments of the present invention and are merely exemplary. Accordingly, those of ordinary skill in the art will recognize that various changes and modifications of the exemplary embodiments described herein can be made without departing from the scope and spirit of the present invention. Descriptions of well-known functions and constructions are omitted for clarity and conciseness.

Figure 1A:
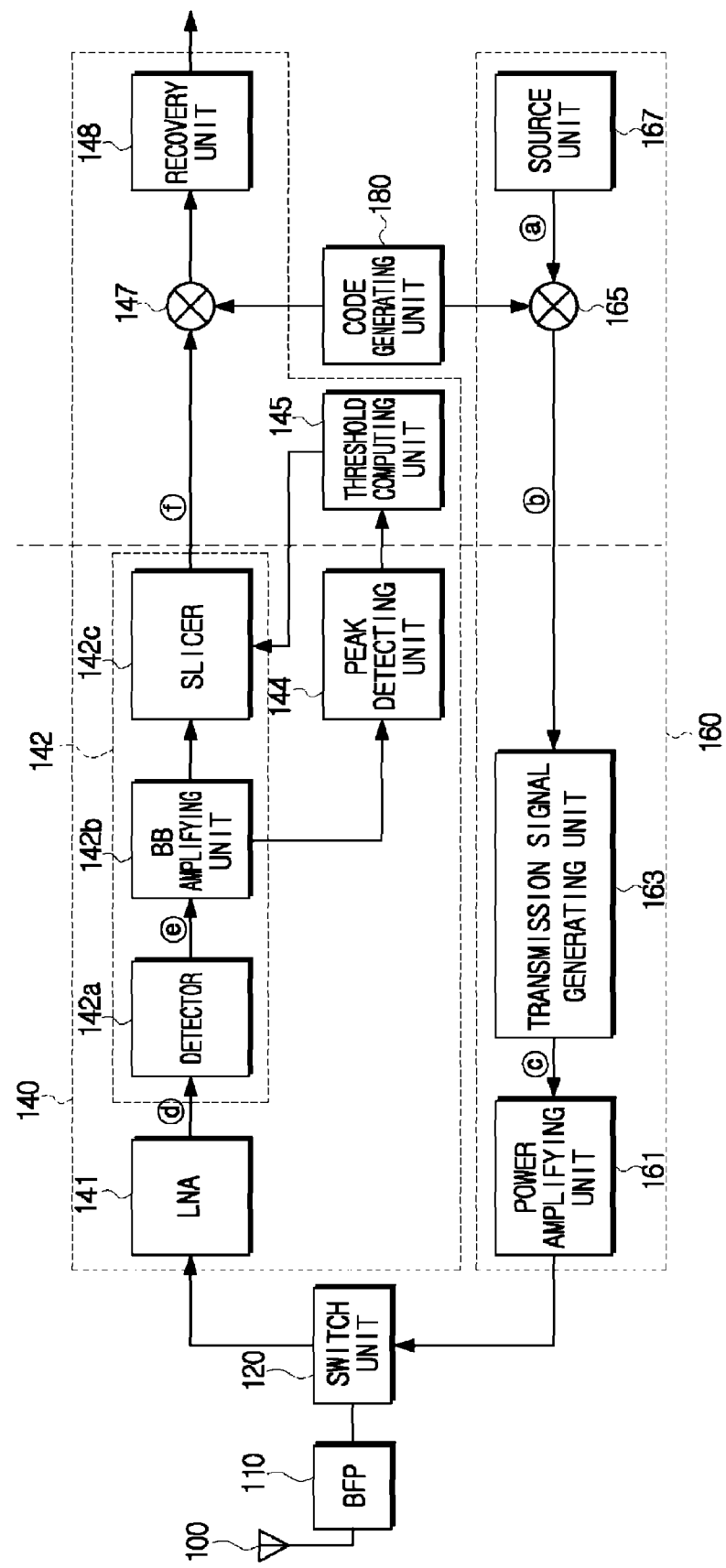
FIG. 1A is a block diagram of a communication apparatus according to an exemplary embodiment of the present invention.
Figure 1B:
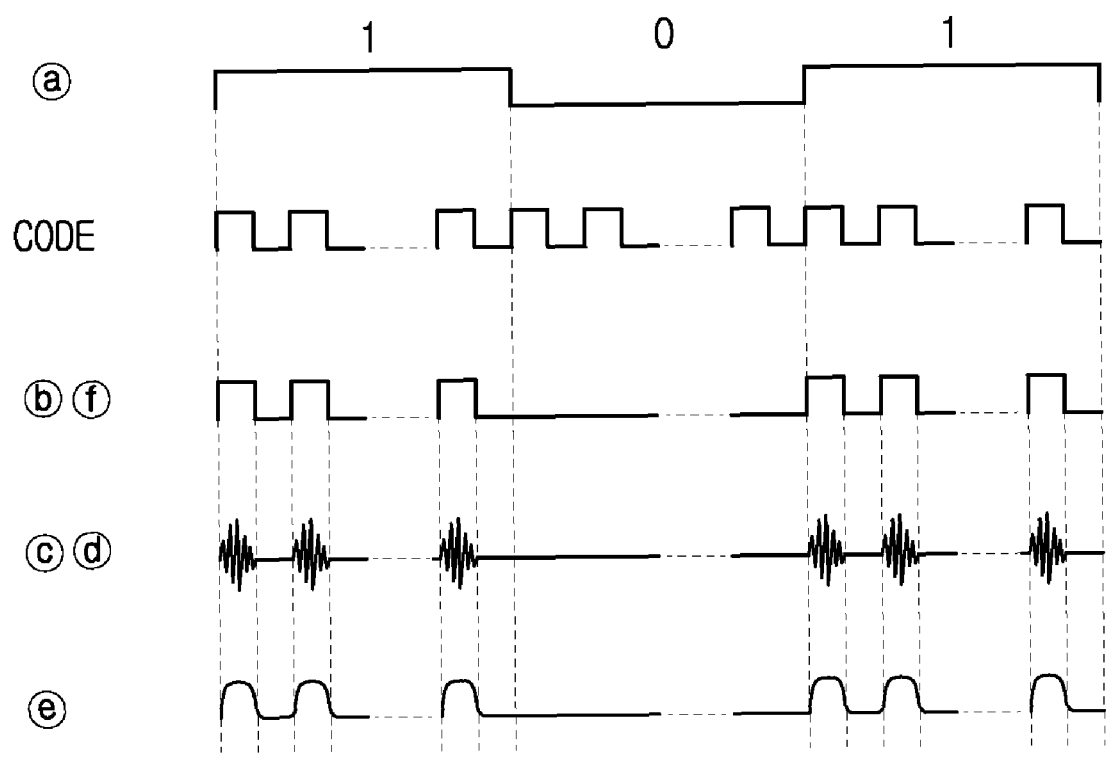
FIG. 1B is a view illustrating a waveform of a signal at respective points of the communication apparatus of FIG. 1A.

FIG. 1A is a block diagram of a communication apparatus according to an exemplary embodiment of the present invention, and FIG. 1B is a view illustrating a waveform of a signal at respective points of the communication apparatus of FIG. 1A.

Referring to FIG. 1A, a communication apparatus according to an exemplary embodiment of the present invention includes an antenna 100, a band pass filter (BPF) 110, a switch unit 120, a receiving unit 140, a transmission unit 160, and a code generating unit 180.

The BPF 110 filters a carrier wave signal being transmitted or received over the antenna 100, to exclusively output the carrier wave signal of certain frequency.

The switch unit 120 performs switching to connect the receiving unit 140 and the transmitting unit 160 to the antenna 100. Accordingly, if a communication apparatus operates as a transmitter, the switch unit 120 causes the transmitting unit 160 to be connected with the antenna, and if the communication apparatus operates as a receiver, the switch unit 120 causes the receiving unit 140 to be connected with the antenna 100.

The code generating unit 180 generates a unipolar code consisting of 1s and 0s, such as an optical orthogonal code (OOC) or a prime sequence code (PSC). The OOC or PSC is a unique code provided to a user for multiple accesses, and prevents interference or collision between communication apparatuses. Other codes may also be used as a user unique code provided for multiaccess, in addition to the OOC and PSC.

The transmitting unit 160 sends out a signal, and includes a source unit 167, a second correlator 165, a transmission signal generating unit 163, and a power amplifying unit 161.

The source unit 167 stores source data for transmission. Referring to FIG. 1B, source data a) in digitized format (consisting of 0s and 1s) is output from the source unit 167.

The second correlator 165 multiplies source data a) being output from the source unit 167 by a code generated at the code generating unit 180, to generate transmission data b). Transmission data b) is in digitized format as shown in FIG. 1B.

The transmission signal generating unit 163 generates transmission signal c), using On-Off Keying (OOK). For example, if transmission data b) is 1, the transmission signal generating unit 163 masks chaotic signal to transmission data b) and outputs the result. If transmission data b) is 0, the transmission signal generating unit 163 outputs a null signal. As a result, chaotic signal c) is generated, in a radio frequency (RF) format corresponding to transmission data b).

The power amplifying unit 161 amplifies the strength of chaotic transmission signal c) and outputs a chaotic carrier signal. The chaotic carrier signal output from the power amplifying unit 161 is transmitted through the antenna 100.

The receiving unit 140 receives chaotic carrier signal and recovers the received signal into original data. The receiving unit 140 includes a low noise amplifier (LNA) 141, a detecting unit 142, a peak detecting unit 144, a threshold computing unit 145, a first correlator 147, and a recovery unit 148.

The LNA 141 amplifies the chaotic carrier signal to a predetermined size and outputs chaotic transmission signal d), so as to correct attenuation of the chaotic carrier signal.

The detecting unit 142 receives chaotic transmission signal d), and then outputs transmission data f). The detecting unit 142 comprises a detector 142a, a BB amplifying unit 142b and a slicer 142c.

The detector 142a detects envelope of chaotic transmission signal d), and outputs curvy signal e) as exemplified in FIG. 1B. The detector 142a may be implemented as a diode.

The BB amplifying unit 142b amplifies curvy signal e) being output from the detector 142a to a predetermined level, and outputs the result to the slicer 142c and the peak detecting unit 144.

The slicer 142c converts curvy signal e) into digitized transmission data f), using hysteresis thresholding with the maximum and minimum levels computed at the threshold computing unit 145, and outputs transmission data f). For example, the slicer 142c outputs data '1' if curvy signal e) exceeds the maximum level, and outputs data '0' if curvy signal e) does not exceed the minimum level, and then accordingly generates transmission data f).

The peak detecting unit 144 computes maximum and minimum averages of curvy signal e) being output from the BB amplifying unit 142b. That is, the peak detecting unit 144 divides one frame of curvy signal e) into a plurality of segments, detects maximum and minimum values of the respective segments, and computes maximum and minimum averages of the one frame. The minimum value of each segment is determined by noise level.

The threshold computing unit 145 computes maximum and minimum levels as the thresholds of curvy signal e), by incorporating the maximum and minimum averages detected at the peak detecting unit 144 into mathematical formula:

$$V_{high} = V_{min} + (Y+X)*\text{Delta}$$ [Mathematical formula 1]

$$V_{low} = V_{min} + (Y-X)*\text{Delta}$$

where $V_{high}$ denotes maximum level, $V_{low}$ denotes minimum level, $V_{max}$ denotes maximum average, $V_{min}$ denotes minimum average, $\text{Delta} = V_{max} - V_{min}$, and X and Y denote variables set by a user according to the simulation to minimize the bit error rate (BER).

The first correlator 147 computes correlativity, by multiplying the transmission data by a code generated at the code generating unit 180.

The recovery unit 148 recovers transmission data f) into original data according to the correlativity computed at the first correlator 147, and outputs the result. In other words, the recovery unit 148 recovers transmission data f) into original data, if determining auto-correlation with the received chaotic carrier signal.

FIGS. 2A to 2D illustrate optical orthogonal coding (OOC) model and correlation model used in a communication apparatus according to an exemplary embodiment of the present invention.

Optical orthogonal code (OOC) employed in the exemplary embodiment of the present invention may be defined by (n, w, λa, λc), where n denotes length of the code, w denotes the number of 1s included in the code, and λa and λc denote status of correlation which indicate the characteristic of the OOC. λa denotes the maximum magnitude of periodic auto-correlation sidelobes, and λc denotes the maximum magnitude of periodic cross-correlation. The characteristic of the OOC according to the exemplary embodiment of the present invention may be expressed by:

TABLE 1

| N | Optical (n, 3, 1, 1) |
|---|---|
| 7  | {0, 1, 3} |
| 13 | {0, 1, 4} {0, 2, 7} |
| 19 | {0, 1, 5} {0, 2, 8} {0, 3, 10} |
| 25 | {0, 1, 6} {0, 2, 9} {0, 3, 11} {0, 4, 13} |

Figure 2A:
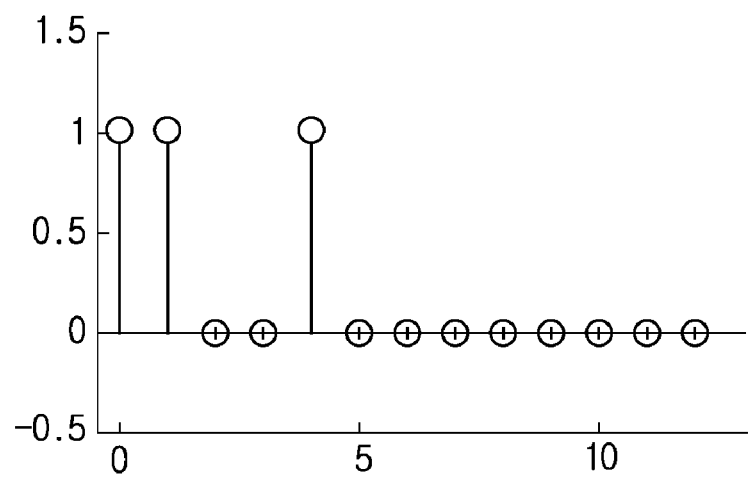
FIGS. 2A to 2D illustrate optical orthogonal coding (OOC) model and correlation model used in a communication apparatus according to an exemplary embodiment of the present invention.
Figure 2B:
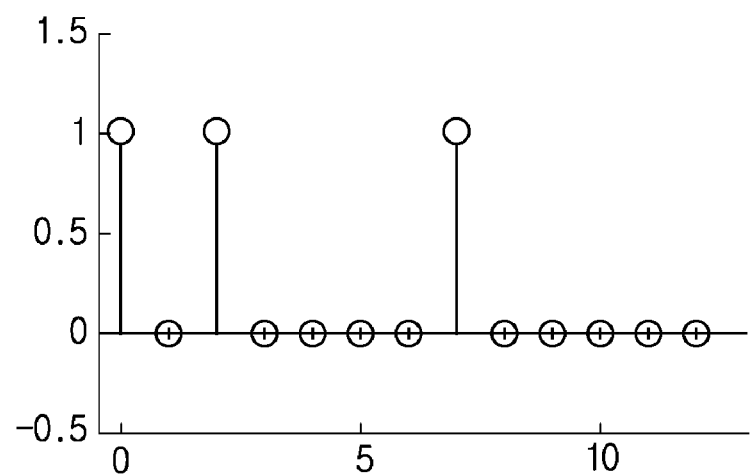

FIG. 2A illustrates an OOC model corresponding to {0, 1, 4}, and FIG. 2B illustrates an OOC model corresponding to {0, 2, 7}. The length of the code in the OOC models illustrated in FIGS. 2A and 2B is 13.

Figure 2C:
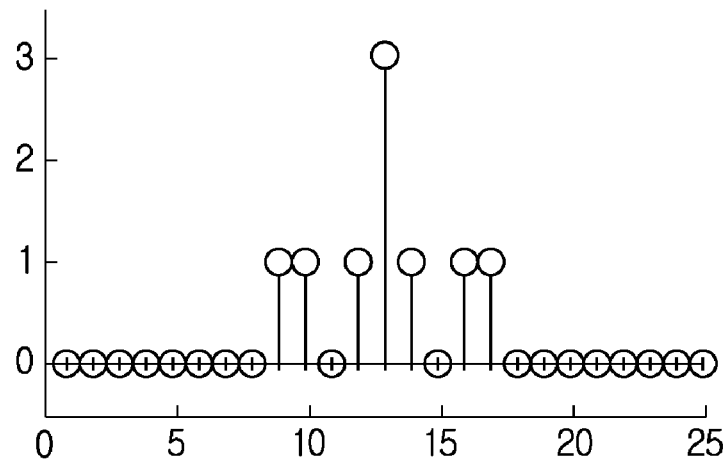
Figure 2D:
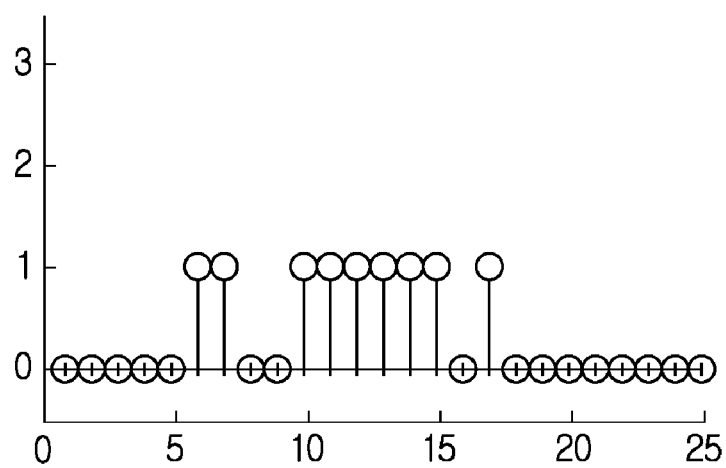

FIGS. 2C and 2D show the correlation between the two OOC {0, 1, 4} and {0, 2, 7}. Referring to FIGS. 2C and 2D, λa and λc are 1, respectively, indicating that the two codes have one maximum-overlapping area, even in the asynchronous state.

P of PSC is generated from Galois field GF(P), and may be expressed by:

$$S_x = (s_{x0}, s_{x1}, \ldots, s_{xj}, \ldots, s_{x(p-1)})$$ [Mathematical formula 2]

where $S_x$ denotes a prime sequence, and is generated by multiplying component x of GF(P) by all the other components j of GF(P). GF(P) = {0, 1, ..., j, p-1}.

The characteristic of the PSC may be expressed by the following tables, where p=3 and p=5, respectively:

TABLE 2

| X | 0 | 1 | 2 | sequence | code sequences |
|---|---|---|---|---|---|
| 0 | 0 | 0 | 0 | $S_0$ | $c_0$ = 100 100 100 |
| 1 | 0 | 1 | 2 | $S_1$ | $c_1$ = 100 010 001 |
| 2 | 0 | 2 | 1 | $S_2$ | $c_2$ = 100 001 010 |

TABLE 3

| x | 0 | 1 | 2 | 3 | 4 | sequence | code sequence |
|---|---|---|---|---|---|---|---|
| 0 | 0 | 0 | 0 | 0 | 0 | $S_0$ | $c_0$ = 10000 10000 10000 10000 10000 |
| 1 | 0 | 1 | 2 | 3 | 4 | $S_1$ | $c_1$ = 10000 01000 00100 00010 00001 |
| 2 | 0 | 2 | 4 | 1 | 3 | $S_2$ | $c_2$ = 10000 00100 00001 01000 00010 |
| 3 | 0 | 3 | 1 | 4 | 2 | $S_3$ | $c_3$ = 10000 00010 01000 00001 00100 |
| 4 | 0 | 4 | 3 | 2 | 1 | $S_4$ | $c_4$ = 10000 00001 00010 00100 01000 |

FIGS. 3A to 3D illustrate a signal model being processed by a communication apparatus according to an exemplary embodiment of the present invention.

Figure 3A:
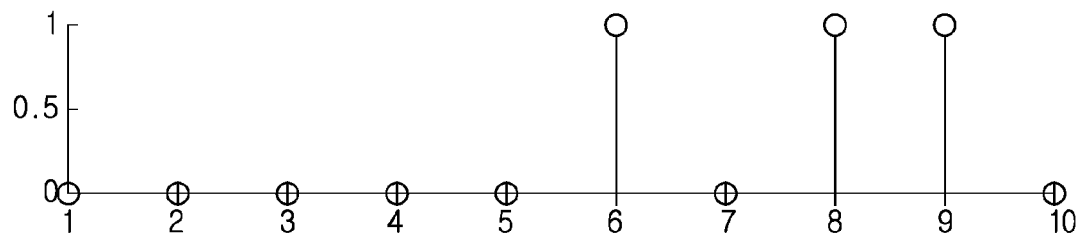
FIGS. 3A to 3D illustrate a signal model being processed by a communication apparatus according to an exemplary embodiment of the present invention.
Figure 3B:
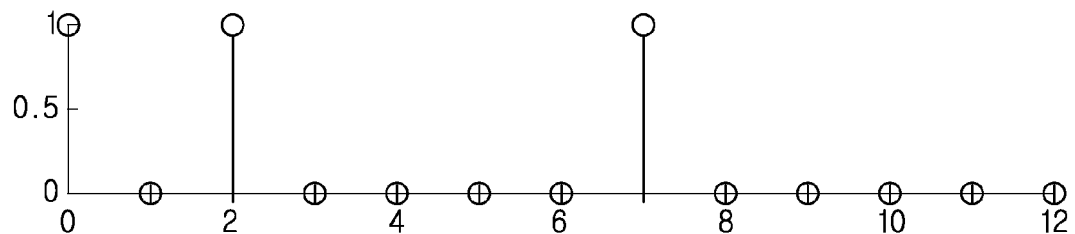

FIG. 3A illustrates a source data model for transmission, which has the value of [0000010110]. FIG. 3B illustrates an OOC model, which has the value of {0, 2, 7}.

Figure 3C:
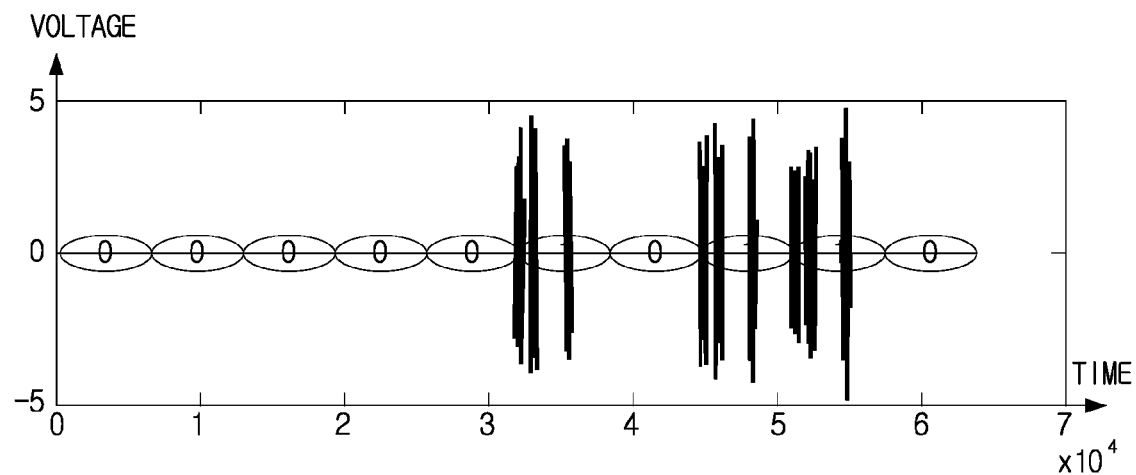

The second correlator 165 obtains transmission data by multiplying source data of [0000010110] by OOC of {0, 2, 7} generated at the code generating unit 180, and obtains the results as illustrated in FIG. 3C by masking chaotic signal with respect to the transmission data. As shown, chaotic signal is masked to OOC of {0, 2, 7} and output, when the source data is 1.

Figure 3D:
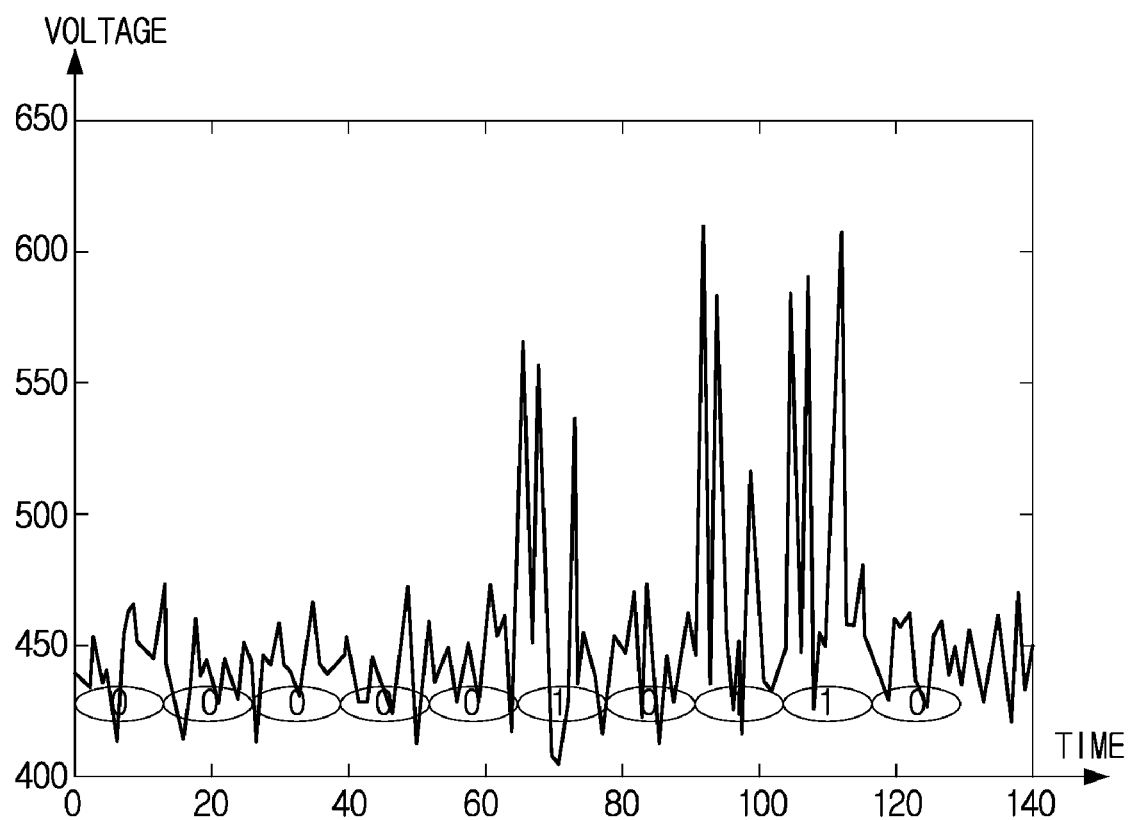

FIG. 3D shows curved signal e) which is output from the detector 142a and input to the BB amplifying unit 142b. If data is identical to that shown in FIG. 3C, that is, if data is 1, the curved signal corresponding to OOC of {0, 2, 7} is detected in the size as illustrated in FIG. 3D. The BB amplifying unit 142b amplifies the curved signal of FIG. 3D to a predetermined level, and outputs the amplified signal.

The same methods illustrated in FIGS. 3A to 3D are applicable to the PSC.

Figure 4A:
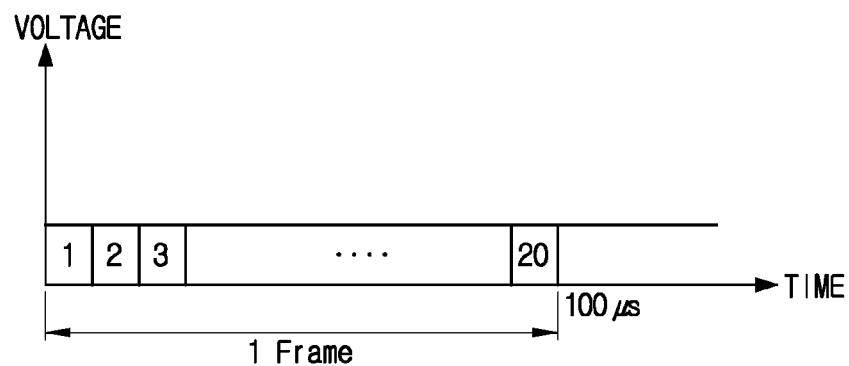
FIGS. 4A and 4B are views provided for explaining a peak detecting unit of a communication apparatus according to an exemplary embodiment of the present invention.
Figure 4B:
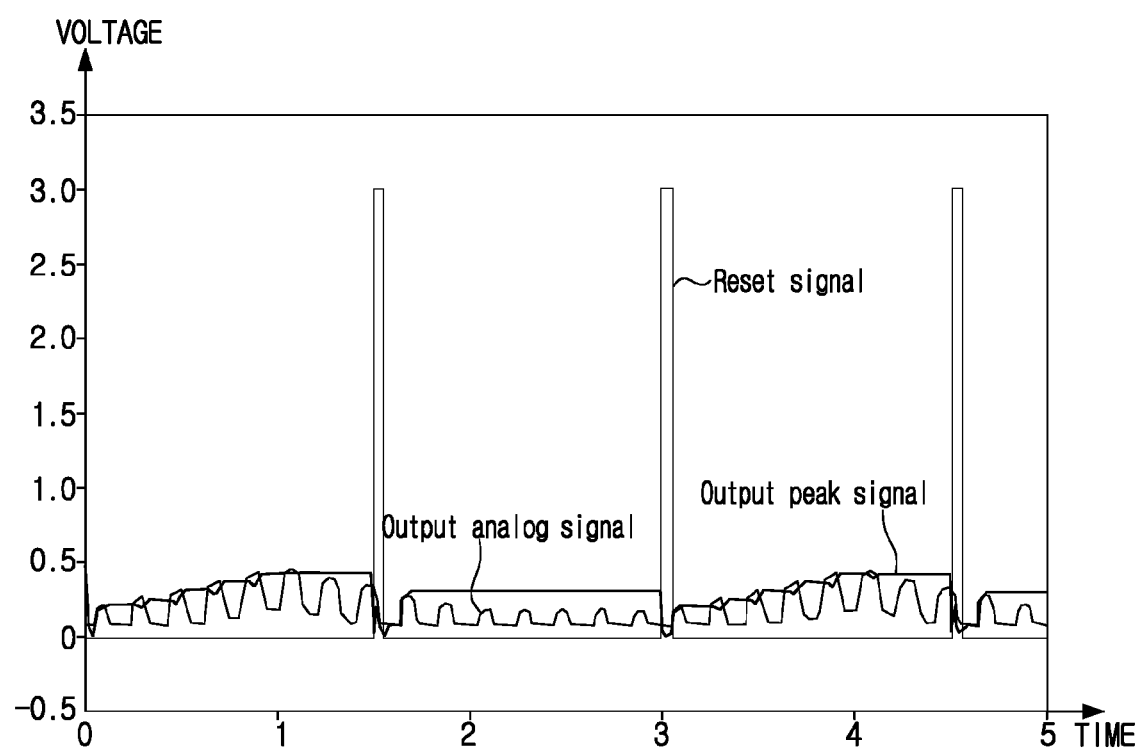

FIGS. 4A and 4B are views provided for explaining a peak detecting unit of a communication apparatus according to an exemplary embodiment of the present invention.

Referring to FIG. 4A, the peak detecting unit 144 divides one frame of curved signal being output from the BB amplifying unit 142b into 20 segments. As illustrated in FIG. 4B, an output analog signal in curved signal format is divided into 20 segments, using reset signal. An output peaks signal of the output analog signal is then detected, and maximum values $V_{max1}$, $V_{max2}$, ..., $V_{max20}$ and minimum values $V_{min1}$, $V_{min2}$, ..., $V_{min20}$ of the respective segments are detected, using the detected peak signal.

Finally, the peak detecting unit 144 detects the maximum and minimum averages $V_{max}$, $V_{min}$ of one frame, using the detected maximum values $V_{max1}$, $V_{max2}$, ..., $V_{max20}$ and minimum values $V_{min1}$, $V_{min2}$, ..., $V_{min20}$.

Figure 5:
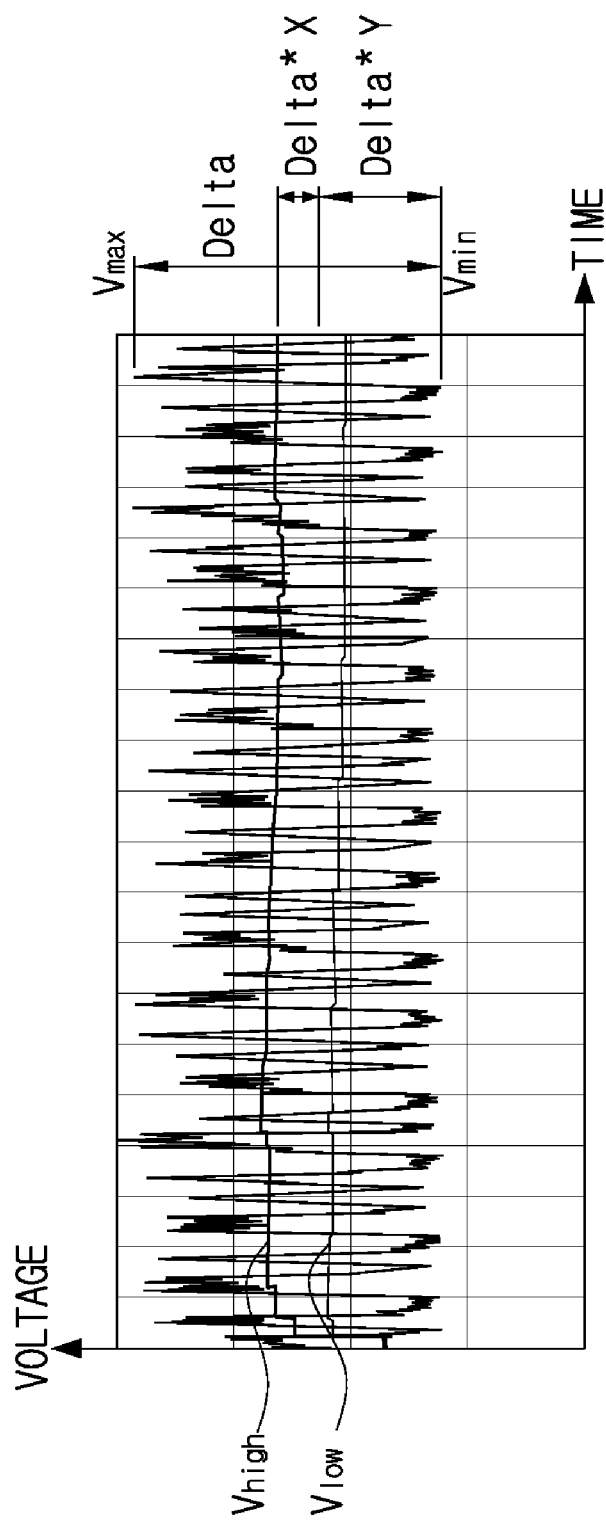
FIG. 5 is a view provided for explaining an operation of a threshold computing unit of a communication apparatus according to an exemplary embodiment of the present invention.

FIG. 5 is a view provided for explaining an operation of a threshold computing unit of a communication apparatus according to an exemplary embodiment of the present invention.

Referring to FIG. 5, the threshold computing unit 145 computes maximum and minimum levels $V_{high}$, $V_{low}$ as the thresholds of curved signal e), by applying the maximum and minimum averages $V_{max}$, $V_{min}$ obtained at the peak detecting unit 144 into mathematical formula 1. The slicer 142c converts curved signal e) into digitized transmission data f), using the computed maximum and minimum levels $V_{high}$, $V_{low}$.

Figure 6:
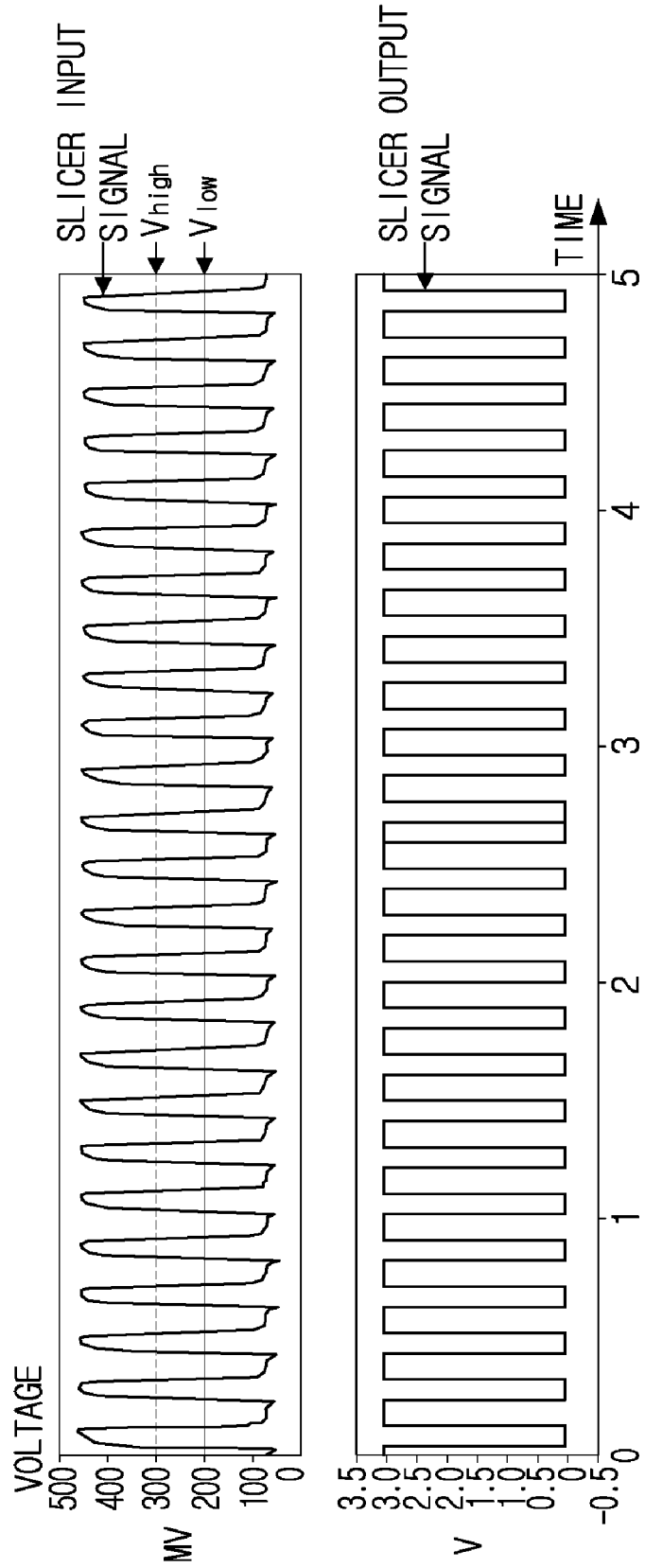
FIG. 6 is a view provided for explaining an operation of a slicer of a communication apparatus according to an exemplary embodiment of the present invention.

FIG. 6 is a view provided for explaining an operation of a slicer of a communication apparatus according to an exemplary embodiment of the present invention.

Referring to FIG. 6, the slicer 142c outputs 1 if the size of incoming curved signal e) is greater than maximum level $V_{high}$, and outputs 0 if the size of incoming curved signal e) is lower than minimum level $V_{low}$.

Figure 7:
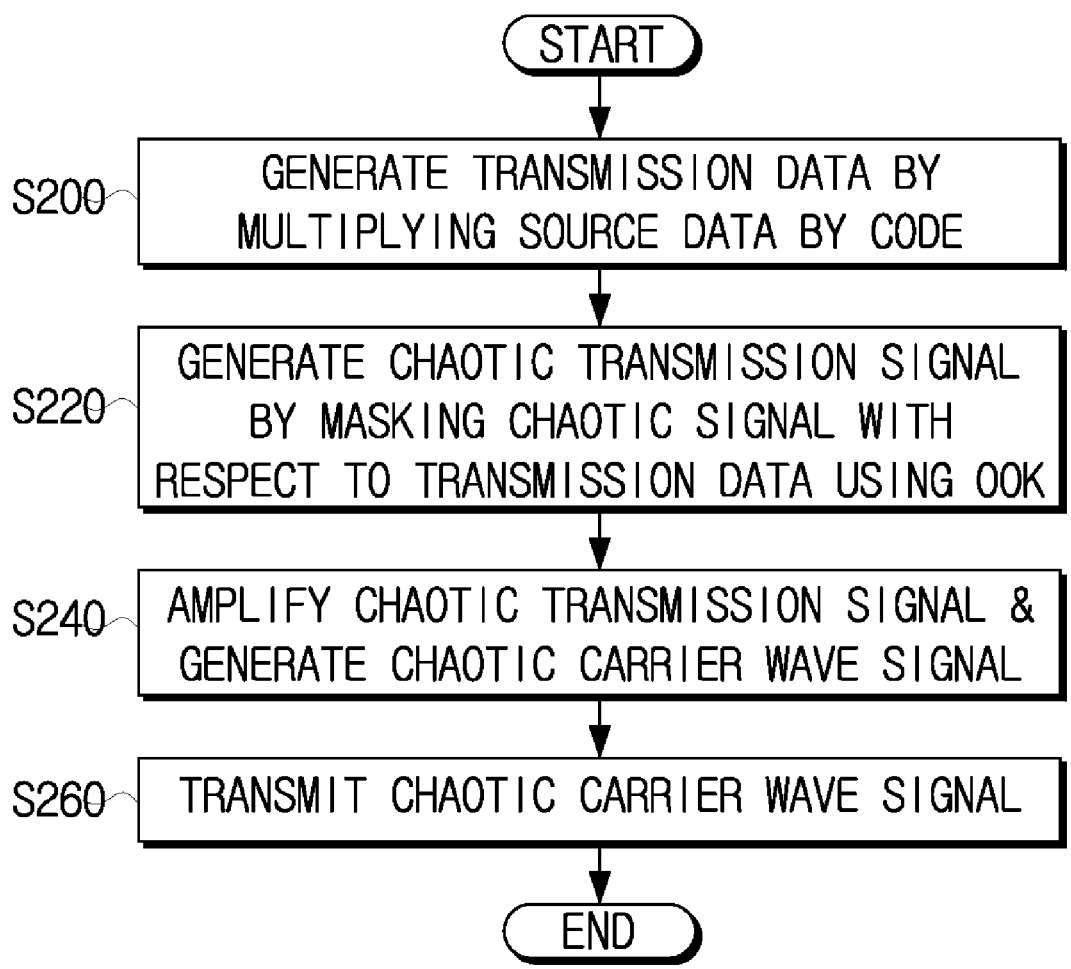
FIG. 7 is a flowchart illustrating the transmission operation of a communication apparatus according to an exemplary embodiment of the present invention.

FIG. 7 is a flowchart illustrating the transmission operation of a communication apparatus according to an exemplary embodiment of the present invention.

Referring to FIG. 7, first, transmission data b) is generated at operation S200 by multiplying source data by the code. Accordingly, digitized transmission data b) is generated, by multiplying the digitized source data a) being stored at source unit 167 by the OOC or PSC being generated at the code generating unit 180.

Next, chaotic signal is masked with respect to transmission data b) using OOK, and as a result, chaotic transmission signal is generated at operation S220. In this situation, the transmission signal generating unit 163 masks the chaotic signal with respect to transmission data b) and outputs the result if transmission data b) is 1, or alternatively, the transmission signal generating unit 163 outputs a null signal and generates chaotic transmission signal c) if transmission data b) is 0.

The power amplifying unit 161 amplifies the amplitude of chaotic transmission signal c) and generates chaotic carrier wave signal at operation S240. Finally, the chaotic carrier wave signal is transmitted over the antenna 100 at operation S260.

As explained above, chaotic signal is masked to the transmission signal and transmitted, using OOK.

Figure 8:
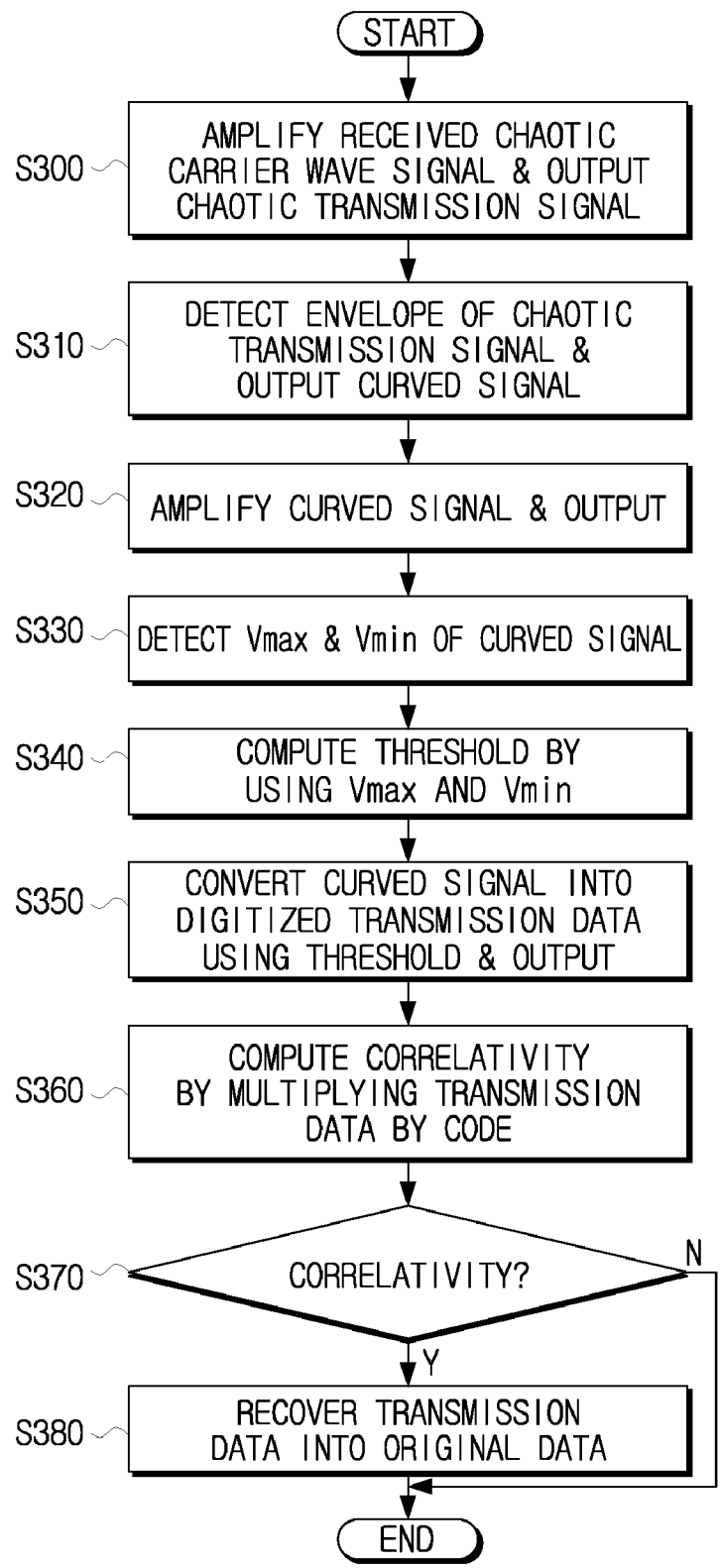
FIG. 8 is a flowchart illustrating the reception operation of a communication apparatus according to an exemplary embodiment of the present invention.

FIG. 8 is a flowchart illustrating the reception operation of a communication apparatus according to an exemplary embodiment of the present invention.

Referring to FIG. 8, the LNA 141 amplifies the amplitude of the chaotic carrier wave signal being received over the antenna 100, and outputs transmission chaotic signal d) at operation S300. The detector 142a detects envelope of chaotic transmission signal d), and outputs curved signal e) at operation S310. The BB amplifying unit 142b amplifies curved signal e) to a predetermined level and outputs the result at operation S320, and the peak detecting unit 144 detects maximum and minimum averages $V_{max}$, $V_{min}$ of curved signal e) at operation S330.

The threshold computing unit 145 computes maximum and minimum levels $V_{high}$, $V_{low}$ as the thresholds for curved signal e), by incorporating the maximum and minimum averages $V_{max}$, $V_{min}$ into mathematical formula 1 at operation S340.

The slicer 142c converts the curved signal into digitized transmission data using the thresholds, and outputs the result at operation S350. The slicer 142c outputs 1 if the size of curved signal e) is greater than maximum level $V_{high}$, and outputs 0 if the size of curved signal e) is less than minimum level $V_{low}$.

The first correlator 147 computes correlativity by multiplying transmission data f) by the code being generated at the code generating unit 180 at operation S360. If determining correlativity at operation S370, the recovery unit 148 recovers transmission data f) to original data at operation S380. Accordingly, as illustrated in FIGS. 2A and 2B, if there is one point having the maximum value 3 even in the asynchronous state, auto-correlativity is determined, and therefore, transmission data f) is recovered to the original data.

As a result, data can be detected from the received carrier wave signal efficiently.

According to the exemplary embodiments of the present invention as explained above, multiple access under asynchronous transmission environment is enabled, by masking chaotic signal with respect to the transmission signal being generated through OOC or PSC, using OOK. Furthermore, by adopting non-coherent scheme which uses varied threshold according to the characteristic of the received carrier wave signal, a wireless communication system for short-distance operation which is economic, and less power-consuming, can be provided.

The foregoing embodiments and advantages are merely exemplary and are not to be construed as limiting the present invention. The present teaching can be readily applied to other types of apparatuses. The description of the exemplary embodiments of the present invention is intended to be illustrative, and not to limit the scope of the claims. Many alternatives, modifications, and variations will be apparent to those skilled in the art.

What is claimed is:

1. A communication apparatus, comprising:
a correlator which multiplies source data by a user unique code provided for multiaccess, and outputs transmission data;
a transmission signal generating unit which generates a chaotic transmission signal by masking the transmission data with respect to a chaotic signal;
an antenna which transmits the chaotic transmission signal;
a detecting unit which detects an envelope of the chaotic transmission signal being received over the antenna, and converts the chaotic transmission signal into a curved signal based on the detected envelope;
a computing unit which computes maximum and minimum levels of the curved signal; and
a slicer which converts the curved signal into digital data, by applying a hysteresis thresholding based on the maximum and minimum levels,
wherein the computing unit computes each of the maximum level and the minimum level based on both a maximum average of the curved signal and a minimum average of the curved signal.

2. The communication apparatus of claim 1, wherein the user unique code is one of an optical orthogonal code (OOC) and a prime sequence code (PSC).

3. The communication apparatus of claim 1, wherein the transmission signal generating unit generates the chaotic transmission signal in radio frequency (RF) format, by masking the chaotic signal with respect to the transmission data using on-off keying (OOK).

4. The communication apparatus of claim 1, wherein the computing unit computes the maximum and minimum levels which are varied in real time basis according to the received chaotic transmission signal.

5. The communication apparatus of claim 1, further comprising a peak detecting unit which divides one frame of the curved signal into a plurality of segments, detects maximum and minimum values of the respective segments, and computes the maximum and minimum averages.

6. The communication apparatus of claim 1, wherein the computing unit computes the maximum and minimum levels by:

$$V_{high}=V_{min}+(Y+X)*\text{Delta}$$

$$V_{low}=V_{min}+(Y-X)*\text{Delta}$$

where $V_{high}$ denotes maximum level, $V_{low}$ denotes minimum level, $V_{max}$ denotes the maximum average, $V_{min}$ denotes the minimum average, $\text{Delta}=V_{max}-V_{min}$, and X and Y denote variables set by a user according to the simulation to minimize the bit error rate (BER).

7. A communication apparatus, comprising:
a detecting unit which detects an envelope of a received chaotic transmission signal and converts the chaotic transmission signal into a curved signal based on the detected envelope;
a computing unit which computes maximum and minimum levels of the curved signal;
a slicer which converts the curved signal into digital data, by applying a hysteresis thresholding based on the maximum and minimum levels; and
a correlator which computes correlativity by multiplying the digital data by one of optical orthogonal code (OOC) and prime sequence code (PSC),
wherein the computing unit computes each of the maximum level and the minimum level based on both a maximum average of the curved signal and a minimum average of the curved signal.

8. The communication apparatus of claim 7, wherein the computing unit computes the maximum and minimum levels which are varied in real time basis according to the received chaotic transmission signal.

9. The communication apparatus of claim 7, further comprising a peak detecting unit which divides one frame of the curved signal into a plurality of segments, detects maximum and minimum values of the respective segments, and computes the maximum and minimum averages.

10. The communication apparatus of claim 7, wherein the computing unit computes the maximum and minimum levels by:

$$V_{high}=V_{min}+(Y+X)*\text{Delta}$$

$$V_{low}=V_{min}+(Y-X)*\text{Delta}$$

where $V_{high}$ denotes maximum level, $V_{low}$ denotes minimum level, $V_{max}$ denotes the maximum average, $V_{min}$ denotes the minimum average, $\text{Delta}=V_{max}-V_{min}$, and X and Y denote variables set by a user according to the simulation to minimize the bit error rate (BER).

11. The communication apparatus of claim 7, further comprising a transmission signal generating unit which generates the chaotic transmission signal in radio frequency (RF) format, by masking the chaotic signal with respect to the transmission data using on-off keying (OOK).

12. The communication apparatus of claim 7, further comprising:
an antenna which transmits and receives the chaotic transmission signal; and
a switch unit which connects, by switching, the antenna with the detecting unit if the communication apparatus operates as a receiver, and which connects, by switching, the antenna with the transmission signal generating unit if the communication apparatus operates as a transmitter.

13. A communication method, comprising:
detecting an envelope of a received chaotic transmission signal, and converting to the chaotic transmission signal into a curved signal based on the detected envelope;
computing maximum and minimum levels of the curved signal; and
converting the curved signal into digital data, by applying a hysteresis thresholding based on the maximum and minimum levels; and
computing correlativity by multiplying the digital data by a user unique code provided for multiaccess,
wherein the computing the maximum and minimum levels comprises computing each of the maximum level and the minimum level based on both a maximum average of the curved signal and a minimum average of the curved signal.

14. The communication method of claim 13, wherein the user unique code is one of optical orthogonal code (OOC) and prime sequence code (PSC).

15. The communication method of claim 13, wherein the computing the maximum and minimum levels comprises computing the maximum and minimum levels which are varied in real time basis according to the received chaotic transmission signal.

16. The communication method of claim 13, further comprising:
dividing one frame of the curved signal into a plurality of segments; and
detecting maximum and minimum values of the respective segments, and computing the maximum and minimum averages.

17. The communication method of claim 13, wherein the computing the maximum and minimum levels comprises computing the maximum and minimum levels by:

$$V_{high} = V_{min} + (Y+X)*\text{Delta}$$

$$V_{low} = V_{min} + (Y-X)*\text{Delta}$$

where $V_{high}$ denotes maximum level, $V_{low}$ denotes minimum level, $V_{max}$ denotes the maximum average, $V_{min}$ denotes the minimum average, $\text{Delta}=V_{max}-V_{min}$, and X and Y denote variables set by a user according to the simulation to minimize the bit error rate (BER).

18. The communication method of claim 13, further comprising generating the chaotic transmission signal in radio frequency (RF) format, by masking the chaotic signal with respect to the transmission data using on-off keying (OOK).

* * * * *